United States Patent
Lai et al.

(10) Patent No.: US 8,248,011 B2
(45) Date of Patent: Aug. 21, 2012

(54) METHOD AND DEVICE FOR DRIVING A TWO-PHASE BRUSHLESS MOTOR

(75) Inventors: Sung-Ming Lai, Hsinchu (TW); Chia-Tai Yang, Tainan (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 366 days.

(21) Appl. No.: 12/717,121

(22) Filed: Mar. 3, 2010

(65) Prior Publication Data

US 2011/0121770 A1    May 26, 2011

(30) Foreign Application Priority Data

Nov. 25, 2009  (TW) ............................... 98140121 A (51) Int. Cl.
*H02P 6/18* (2006.01)
(52) U.S. Cl. .............................. 318/400.32; 318/400.34
(58) Field of Classification Search ............. 318/400.32, 318/400.34, 400.35
See application file for complete search history.

(56) References Cited

U.S. PATENT DOCUMENTS

| 3,678,352 | A | * | 7/1972 | Bedford | .................... 318/400.41 |
| 4,162,435 | A | * | 7/1979 | Wright | ....................... 318/400.04 |
| 5,023,527 | A | * | 6/1991 | Erdman et al. | ........... 318/400.34 |
| 5,134,349 | A | * | 7/1992 | Kruse | ....................... 318/400.34 |
| 5,585,703 | A | * | 12/1996 | Acquaviva | ............... 318/400.03 |

* cited by examiner

*Primary Examiner* — Bentsu Ro
(74) *Attorney, Agent, or Firm* — Winston Hsu; Scott Margo (57) ABSTRACT

A method for driving a two-phase brushless motor is disclosed. The motor includes a rotator with permanent magnetism and a stator including a first coil and a second coil. The method includes activating the two-phase brushless motor, detecting an output voltage of a disabled coil of the first coil and the second coil to generate a detection result, comparing the detection result and a reference voltage to determine a commutation time point between the first coil and the second coil, generating a commutation signal according to the commutation time point, and driving the two-phase brushless motor according to the commutation time point.

26 Claims, 9 Drawing Sheets

METHOD AND DEVICE FOR DRIVING A TWO-PHASE BRUSHLESS MOTOR

BACKGROUND OF THE INVENTION

1. Field of the Invention

The present invention is related to a method and device for driving a two-phase brushless motor, and more particularly, to a method and device for detecting a position of a rotator of the motor according to an output voltage of a stator coil.

2. Description of the Prior Art

With advances in electronic circuit technology, heat dissipation problems are increasingly critical for electronic devices. To enhance heat dissipation efficiency, heat dissipation fans are embedded in the electronic devices, implying even more stringent specification requirements for weight, noise, and cost of the heat dissipation fan. Compared to a conventional direct current (DC) brush motor, a two-phase brushless motor has advantages of light weight, rapid acceleration, and low noise, and therefore is widely employed in personal computer components, such as a central processing unit (CPU), a graphics card, and a power supply.

Figure 1:
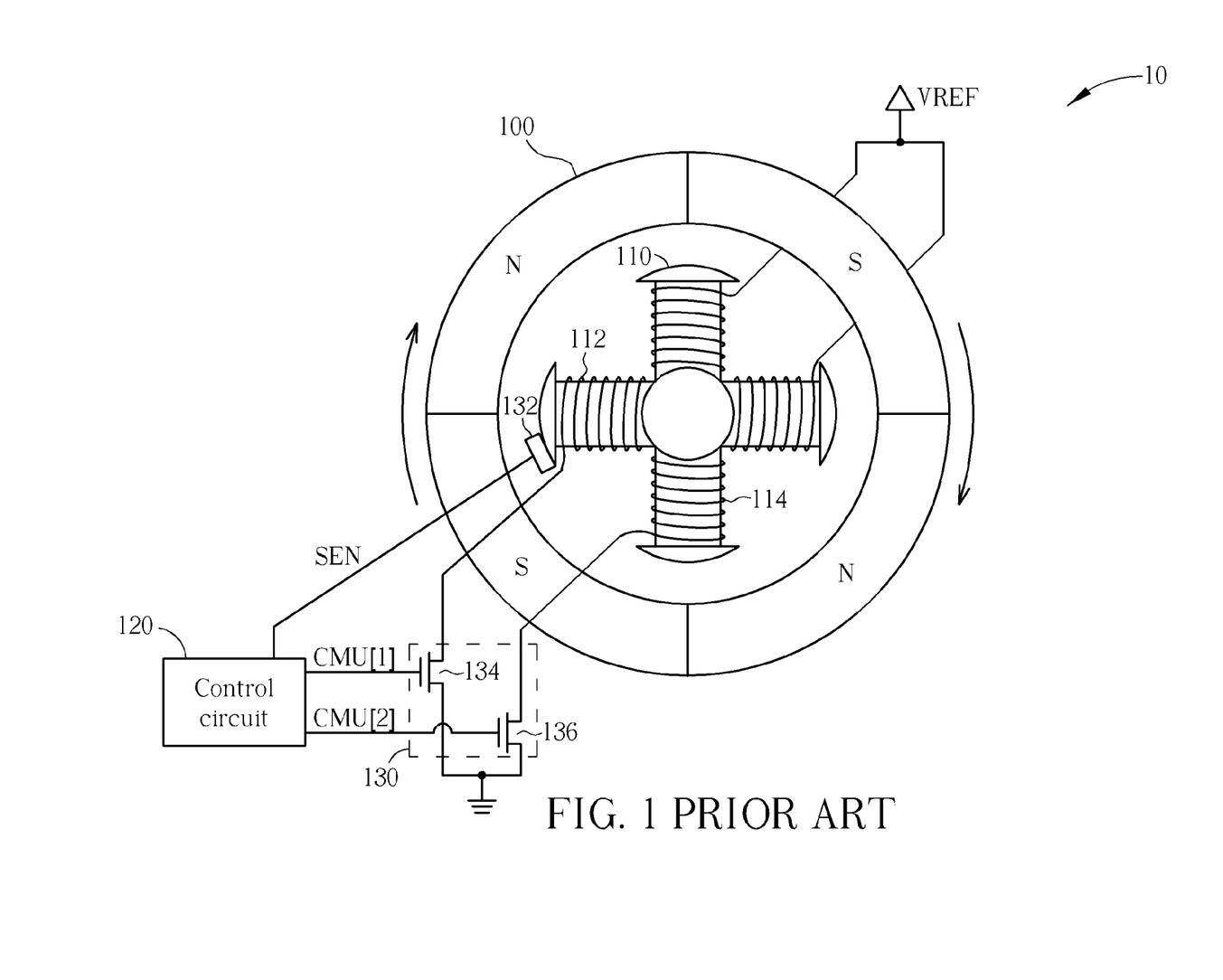
FIG. 1 is a schematic diagram of a two-phase brushless motor system of the prior art.

Please refer to FIG. 1, which is a schematic diagram of a two-phase brushless motor system 10 of the prior art. The two-phase brushless motor system 10 includes a rotator 100, a stator 110, a control circuit 120, a driving unit 130 and a Hall sensor 132. The rotator 100 includes four magnetic poles (two with north (N) magnetism and the other two with south (S) magnetism). The stator 110 includes a first coil 112 and a second coil 114 for varying magnetic field its vicinity through electromagnetic induction to drive the rotator 100. The Hall sensor 132 is generally installed on the stator 110, and is utilized for sensing magnetic field variances induced by the rotating rotator 100, i.e. determining a current position of the Hall sensor 132 corresponding to N or S magnetism, to generate a sensing signal SEN carrying positional information of the rotator 100 sent to the control circuit 120. The control circuit 120 generates commutation signals CMU[1], CMU[2] sent to the driving unit 130. The driving unit 130 includes a first switch transistor 134 and a second switch transistor 136 respectively utilized for controlling currents passing through the first coil 112 and the second coil 114 according to the corresponding commutation signals CMU[1], CMU[2] to ensure that the rotator 100 can rotate continuously.

In short, the two-phase brushless motor system 10 detects the position of the rotator 100 through the Hall sensor 132 to determine commutation time points between the first coil 112 and the second coil 114, and accordingly switches the conducting coil thereof through the driving unit 130 at the commutation time points. As a result, by periodically detecting the position of the rotator 100 and switching the conducting coil, the two-phase brushless motor system 10 can ensure that the rotator 100 rotates without interruption. However, due to limited sensitivity, the Hall sensor 132 cannot correctly detect the position of the rotator 100 when the magnetic variances are insignificant, e.g. during a period in which the motor just begins to rotate. In such a situation, the control circuit 120 cannot determine the next commutation time point, leading to undetermined operation statuses of the first coil 112 and second coil 114. Once the magnetic field provided by the stator 110 stops alternating, the rotator 100 stops rotating. In addition, installation of the costly Hall sensor 132 is disadvantageous for minimizing volume and cost of the two-phase brushless motor system 10, especially when the two-phase brushless motor system 10 has to be embedded within the electronic device.

Therefore, developing a sensing method capable of replacing functions of the Hall sensor to decrease manufacturing cost of the two-phase brushless motor has been a major focus of the industry.

SUMMARY OF THE INVENTION

It is therefore a primary objective of the claimed invention to provide a method and device for driving a two-phase brushless motor.

The present invention discloses a method for driving a two-phase brushless motor, which comprises a rotator with permanent magnetism and a stator comprising a first coil and a second coil. The method comprises activating the two-phase brushless motor, detecting an output voltage of a disabled coil of the first coil and the second coil to generate a detection result, comparing the detection result and a reference voltage to determine a commutation time point between the first coil and the second coil, generating a commutation signal according to the commutation time point, and driving the two-phase brushless motor according to the commutation signal.

The present invention further discloses a driver for driving a two-phase brushless motor, which comprises a rotator with permanent magnetism and a stator comprising a first coil and a second coil. The driver comprises an activation unit coupled to the two-phase brushless motor for activating the two-phase brushless motor, a detection unit coupled to the two-phase brushless motor for detecting an output voltage of a disabled coil among the first coil and the second coil to generate a detection result, a comparison unit coupled to the detection unit for comparing the detection result and a reference voltage to determine a commutation time point between the first coil and the second coil, a control unit coupled to the comparison unit for generating a commutation signal according to the commutation time point, and a driving unit coupled to the control unit for driving the two-phase brushless motor according to the commutation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
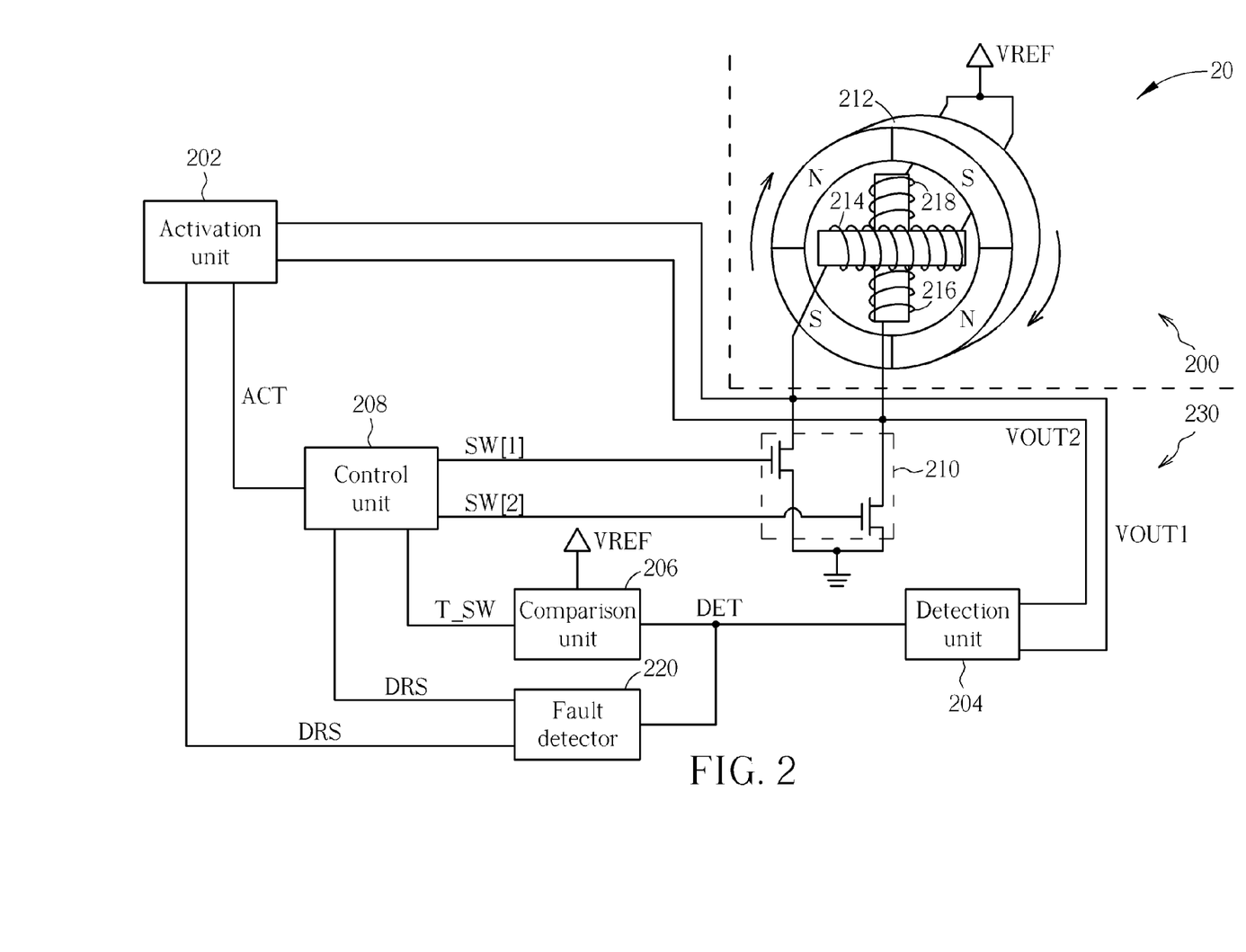
FIG. 2 is a schematic diagram of a driver and a two-phase brushless motor system using the same according to an embodiment of the present invention.

Please refer to FIG. 2, which is a schematic diagram of a driver 230 and a two-phase brushless motor system 20 using the same according to an embodiment of the present invention. In addition to the driver 230, the two-phase brushless motor system 20 includes a two-phase brushless motor 200, which includes a rotator 212 with permanent magnetism and a stator 218 including a first coil 214 and a second coil 216. The driver 230 includes an activation unit 202, a detection unit 204, a comparison unit 206, a control unit 208, a driving unit 210 and a fault detector 220. The activation unit 202 is utilized for activating the two-phase brushless motor 200. The detection unit 204 is utilized for detecting an output voltage of a disabled (passive, floating) coil of the first coil 214 and the second coil 216 to generate a detection result DET. The comparison unit 206 is utilized for comparing the detection result DET and a reference voltage VREF to determine a commutation time point T_SW between the first coil 214 and the second coil 216. The control unit 208 is utilized for generating commutation signals SW[1], SW[2] according to the commutation time point T_SW. The driving unit 210 is utilized for driving the two-phase brushless motor 200 according to the commutation signals SW[1], SW[2]. Finally, the fault detector 220 is utilized for determining whether or not the two-phase brushless motor 200 operates regularly.

In short, the driver 230 supervises output voltages VOUT1, VOUT2 of the first coil 214 and the second coil 216 through the detection unit 204 to select the output voltage of the disabled coil to be the detection result DET. The comparison unit 206 compares the detection result DET and the reference voltage VREF, which functions as a supply voltage of the two-phase brushless motor 200, to determine the next commutation time point T_SW between the first coil 214 and the second coil 216, i.e. the time point at which the two-phase brushless motor 200 commutes. By modulating the corresponding commutation signals SW[1], SW[2], the control unit 208 can switch an active (enabled, conducting) coil and the disabled coil of the first coil 214 and the second coil 216 at the commutation time point T_SW.

Figure 3A:
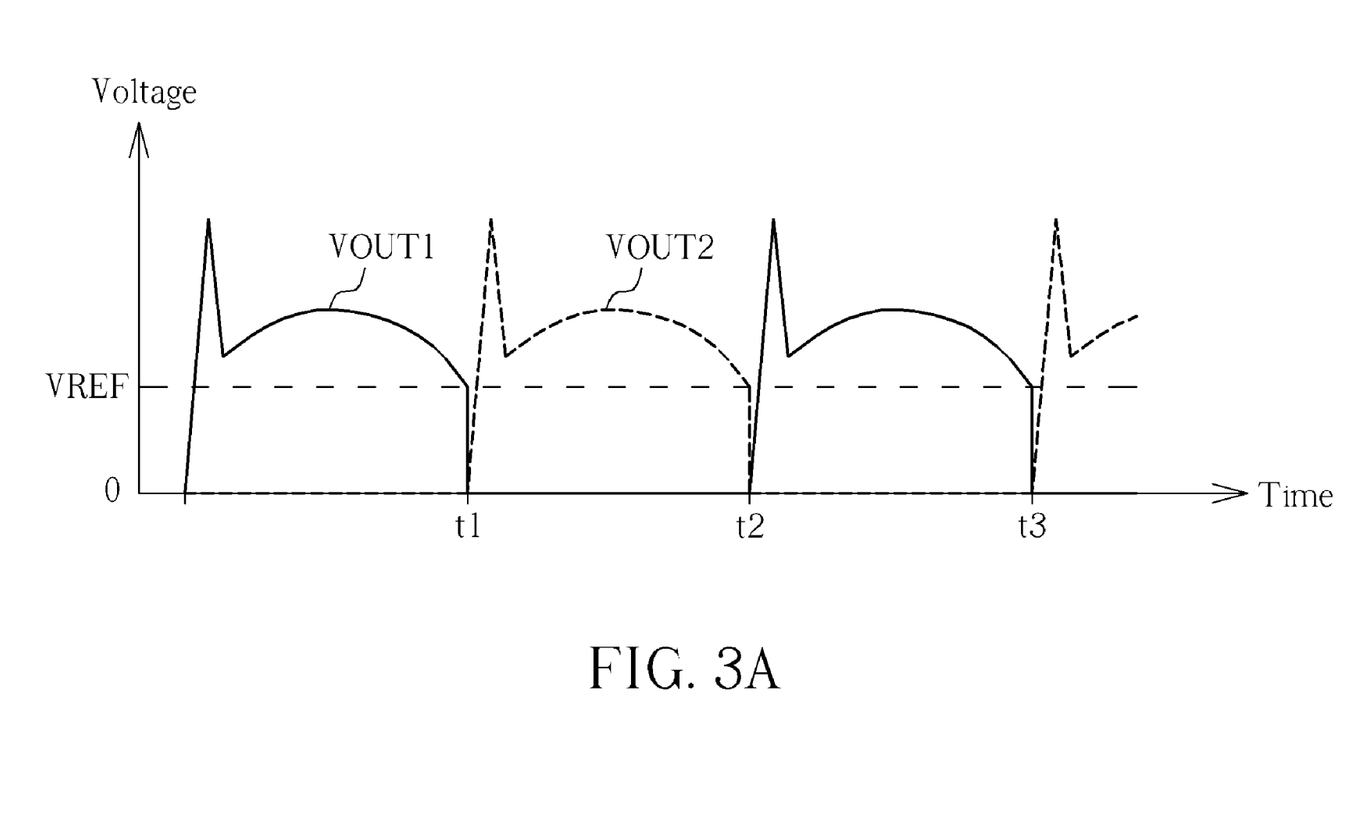
FIG. 3A is a time-variant schematic diagram of output voltages of a first coil and a second coil of the two-phase brushless motor system shown in FIG. 2.

In detail, since the coils 214, 216 function as inductors that tend to prevent any variance of the nearby magnetic field, the disabled coil magnetically responds to magnetic field variances induced by the rotating rotator 212, and causes variances in the corresponding output voltage, as illustrated in FIG. 3A, which is a time-variant schematic diagram of the output voltages VOUT1, VOUT2 of the first coil 214 and the second coil 216. In theory, the output voltage of the disabled coil should be equal to the reference voltage VREF, but in practice the output voltage is higher than the reference voltage VREF due to electromagnetic induction, as illustrated in FIG. 3A. At time points t1, t2, t3 of FIG. 3A, the two-phase brushless motor 200 commutes, the disabled coil is switched from a floating state to a conducting state, and the output voltage of the disabled coil instantaneously falls from a high voltage level higher than the reference voltage VREF to a ground voltage. Therefore, the reference voltage VREF can preferably be chosen as a threshold voltage for determining the commutation time point T_SW. As a result, the comparison unit 206 can compare the detection result DET and the reference voltage VREF to determine the commutation time point T_SW.

Figure 3B:
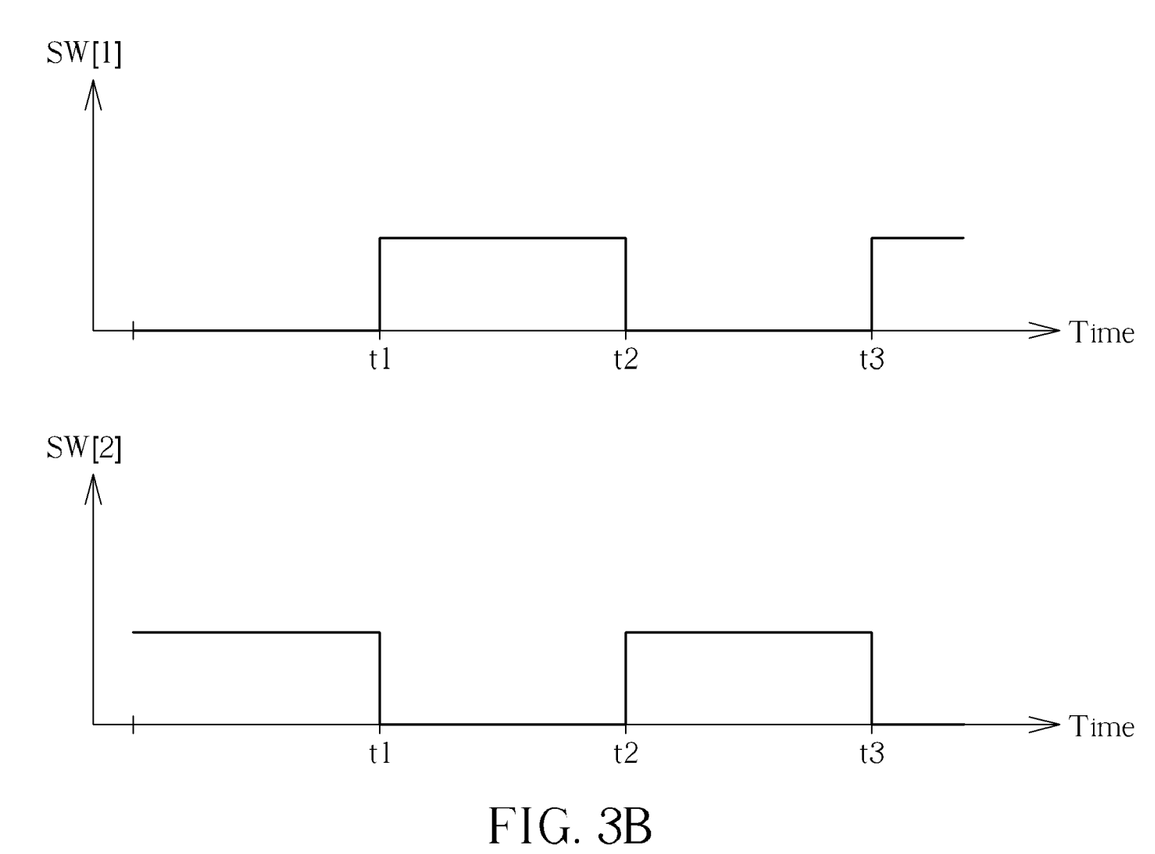
FIG. 3B is a time-variant schematic diagram of commutation signals of the two-phase brushless motor system shown in FIG. 2.

As long as the commutation time point T_SW, such as t1, t2 or t3, is determined, the position of the rotator 214 is known to the control unit 208. Therefore, the control unit 208 can accordingly modulate the commutation signals SW[1], SW[2], i.e. switch levels of the commutation signals SW[1], SW[2] at the commutation time point T_SW, to drive the two-phase brushless motor 200, as illustrated in FIG. 3B. According to the commutation signals SW[1], SW[2], the driving unit 210 can correctly enable the disabled coil and disable the active coil at the commutation time point T_SW.

Figure 4:
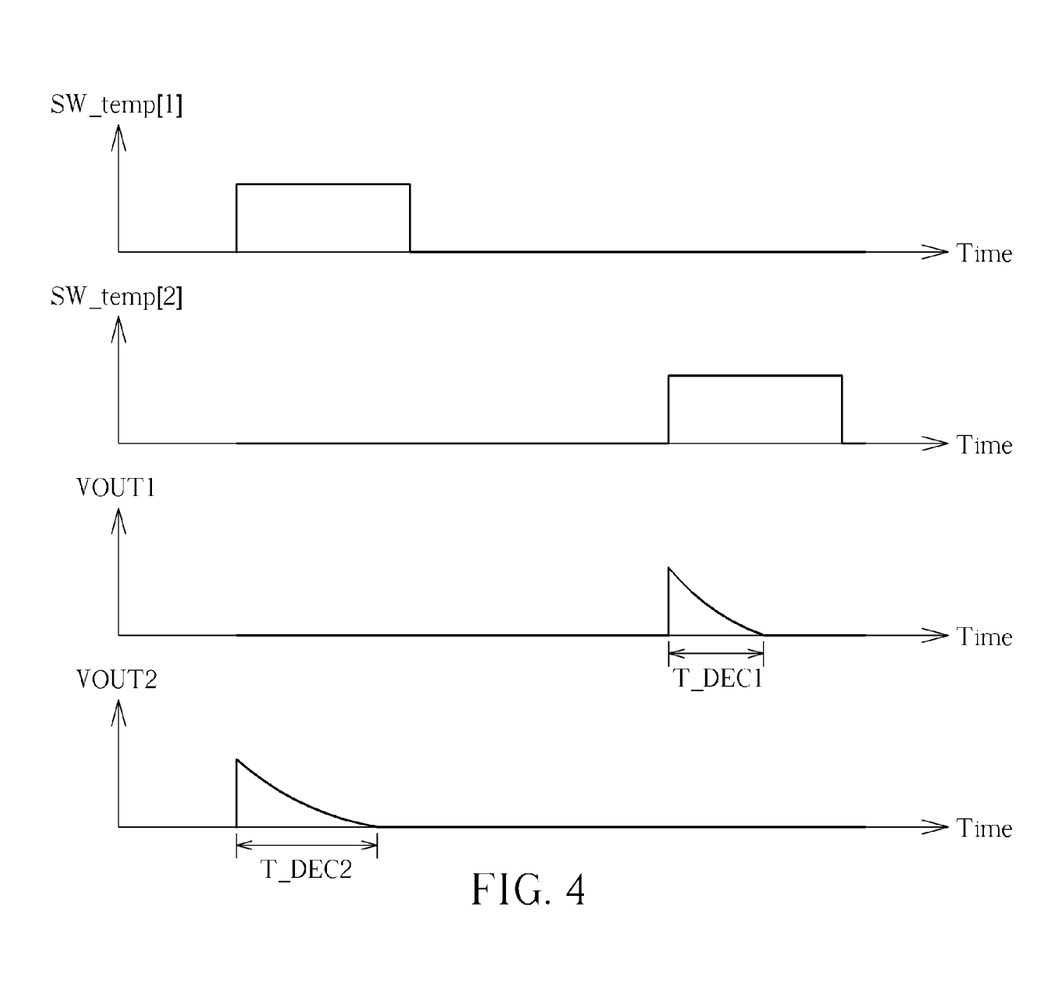
FIG. 4 is a time-variant schematic diagram of temporary commutation signals and the corresponding output voltages of the two-phase brushless motor system shown in FIG. 2.

Note that, when the two-phase brushless motor 200 is completely stopped, the magnetic field nearby the motor 200 is static. That is, the output voltages VOUT1, VOUT2 are static as well, and the control unit 208 cannot accordingly modulate the commutation signals SW[1], SW[2]. For that reason, the driver 230 includes the activation unit 202 to modulate signals required by the two-phase brushless motor 200 during the activation process. More specifically, the activation unit 202 generates an activation signal ACT sent to the control unit 208, and the control unit 208 accordingly generates temporary commutation signals SW_temp[1], SW_temp[2] for controlling the driving unit 210 to respectively and temporarily enable the first coil 214 and the second coil 216 (not at the same time), to generate an electromagnetic response signal, as illustrated in FIG. 4. In FIG. 4, when the temporary commutation signal SW_temp[1] is "ON", the first coil 214 is active, and electromagnetic induction leads to a response voltage potential in the output voltage VOUT2 of the passive second coil 216. Similarly, when the temporary commutation signal SW_temp[2] is "ON", the second coil 216 is active, and a response voltage potential appears in the output voltage VOUT1 of the passive first coil 214. However, decay periods T_DEC1, T_DEC2 of the response voltage potentials appearing in the output signals VOUT1, VOUT2 differ with a starting position of the rotator 212. In other words, the decay periods T_DEC1, T_DEC2 carry information about the starting position of the rotator 212. Therefore, the present invention preferably selects the response voltage potential of the disabled coil of the first coil 214 and the second coil 216 to be the electromagnetic response signal to indicate the starting position of the indicator 212.

Accordingly, the activation unit 202 may further determine the starting position of the rotator 212 according to the decay periods T_DEC1, T_DEC2 of the electromagnetic response signal. As a result, the control unit 208 may modulate an activation commutation signal according to the starting position, such that the rotator 212 originally resting at the starting position can rotate according to a default rotational direction of the two-phase brushless motor 200. Finally, the driving unit 210 supplies power to the first coil 214 or the second coil 216 according to the activation commutation signal.

Figure 5:
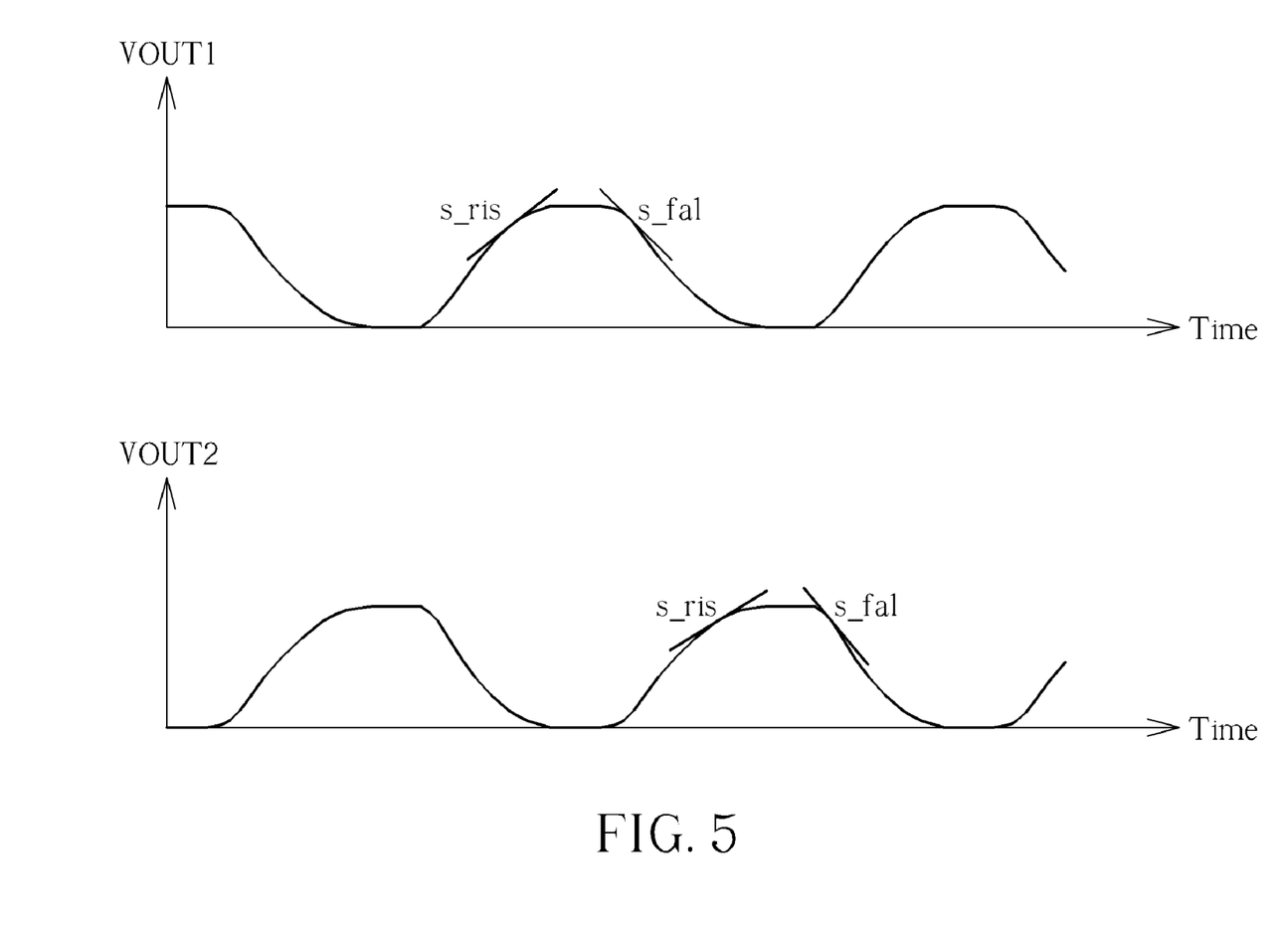
FIG. 5 is a schematic diagram of a rising slope and a falling slope of the output voltages of the two-phase brushless motor system shown in FIG. 2.

However, the two-phase brushless motor 200 may fail to be activated, i.e. the rotator 212 does not rotate according to the default rotational direction. For that reason, the fault detector 220 determines whether the rotator 212 rotates according to the default rotational direction according to the detection result DET to generate a determination result DRS, and accordingly control the two-phase brushless motor 200, as illustrated in FIG. 2. In detail, the activation unit 202 has to set up a suspension period after the rotator 202 starts rotating. The suspension period must be short enough to prevent the two-phase brushless motor 200 from significantly slowing down. During the suspension period, the control unit 208 no longer generates the commutation signals SW[1], SW[2]. Note that, since the two-phase brushless motor 200 is designed to rotate according to the default rotational direction, a rising slope s_ris and a falling slope s_fal of the output voltages VOUT1, VOUT2 are asymmetrical (having different absolute values) when the two-phase brushless motor 200 is rotating, as illustrated in FIG. 5. Therefore, the fault detector 220 can determine whether or not the rotator 212 rotates according to the default rotational direction based upon slope variances of the output voltage of the disabled coil indicated by the detection result DET to generate the determination result DRS. If the determination result DRS indicates that the rotator 212 rotates against the default rotational direction, the control unit 208 stops generating the commutation signals SW[1], SW[2] to stop rotation of the two-phase brushless motor 212. Next, the activation unit 202 restarts the rotation of the two-phase brushless motor 212 after the two-phase brushless motor 212 is completely stopped.

Figure 6A:
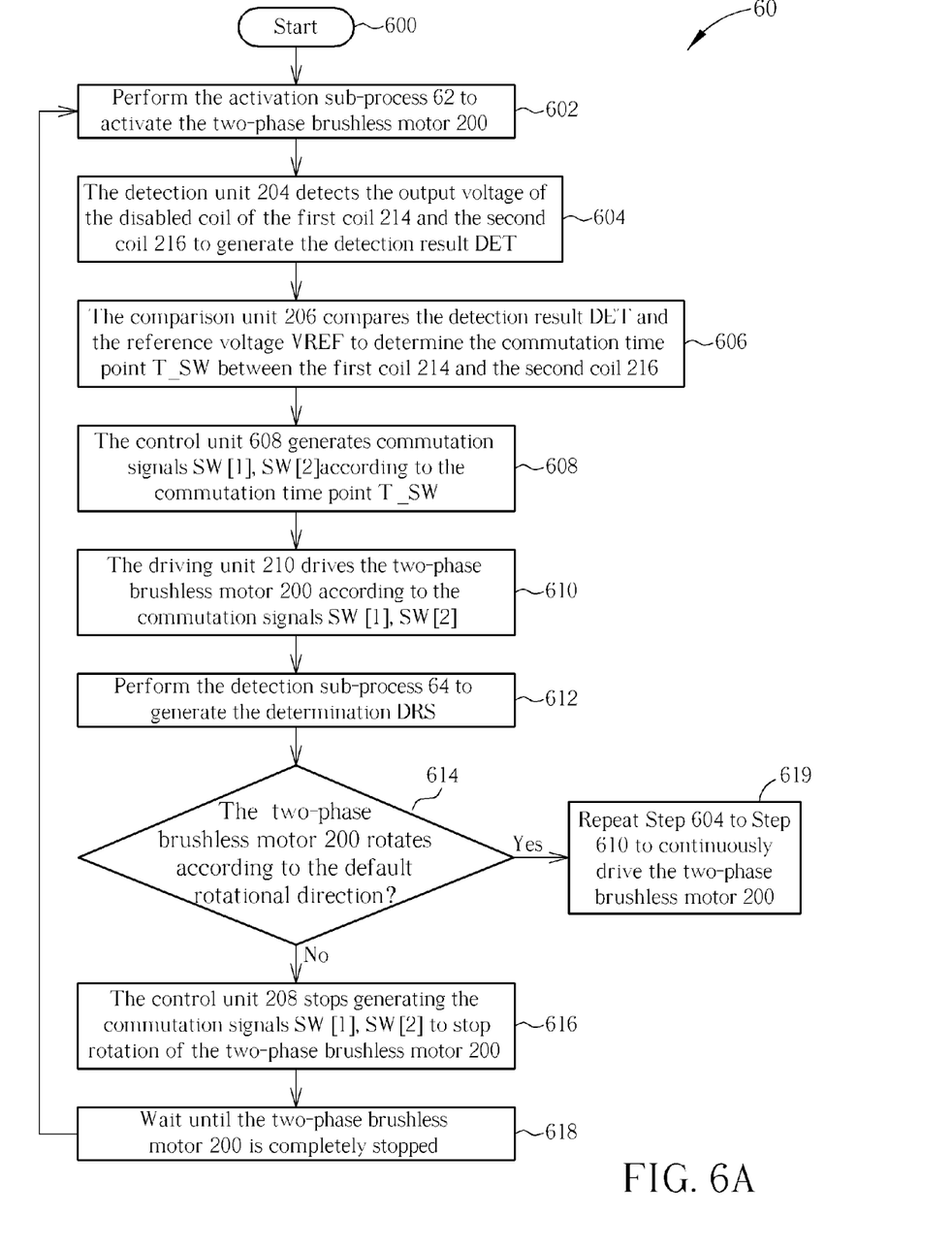
FIG. 6A is a schematic diagram of a process according to an embodiment of the present invention.
Figure 6B:
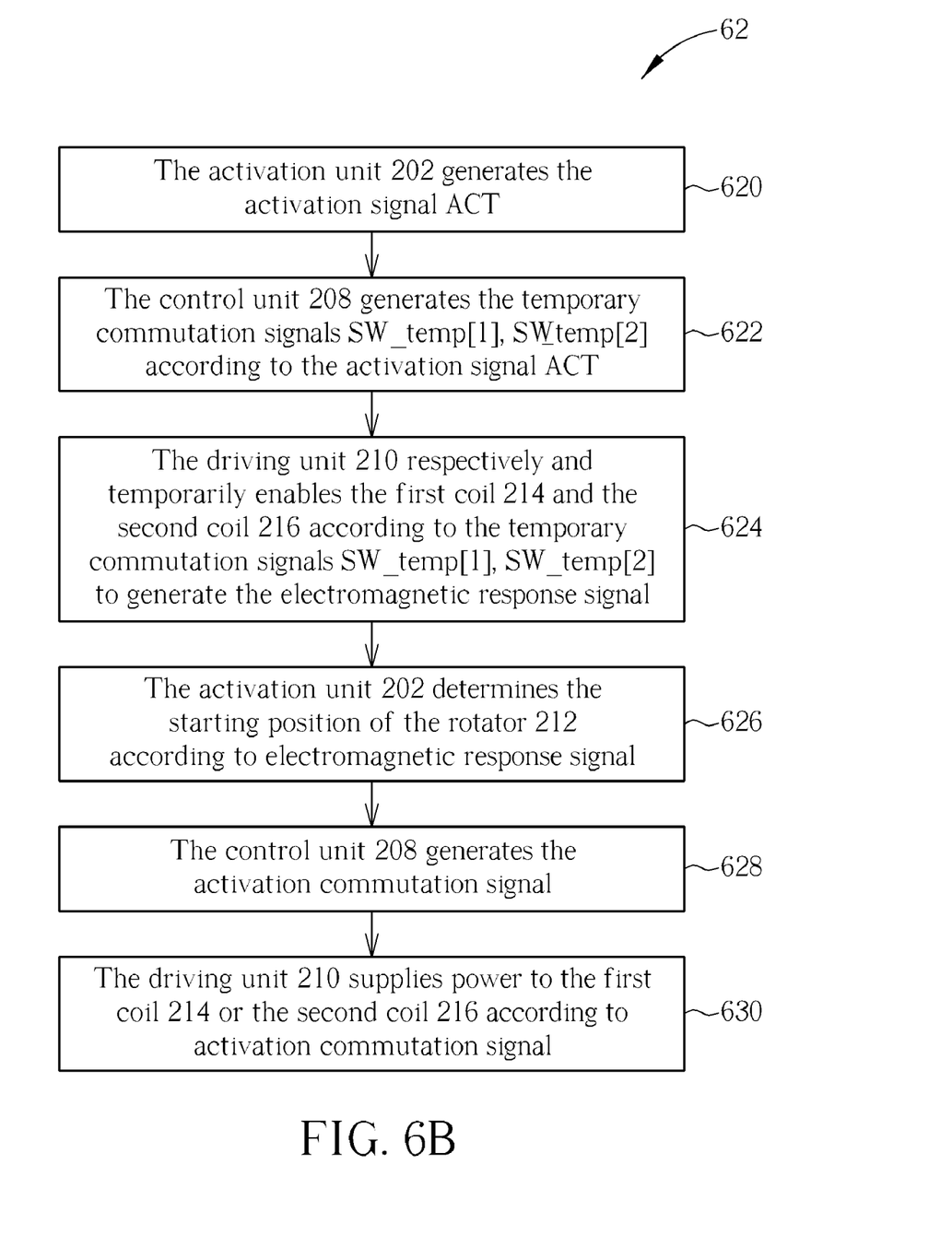
FIG. 6B is a schematic diagram of an activation sub-process according to an embodiment of the present invention.
Figure 6C:
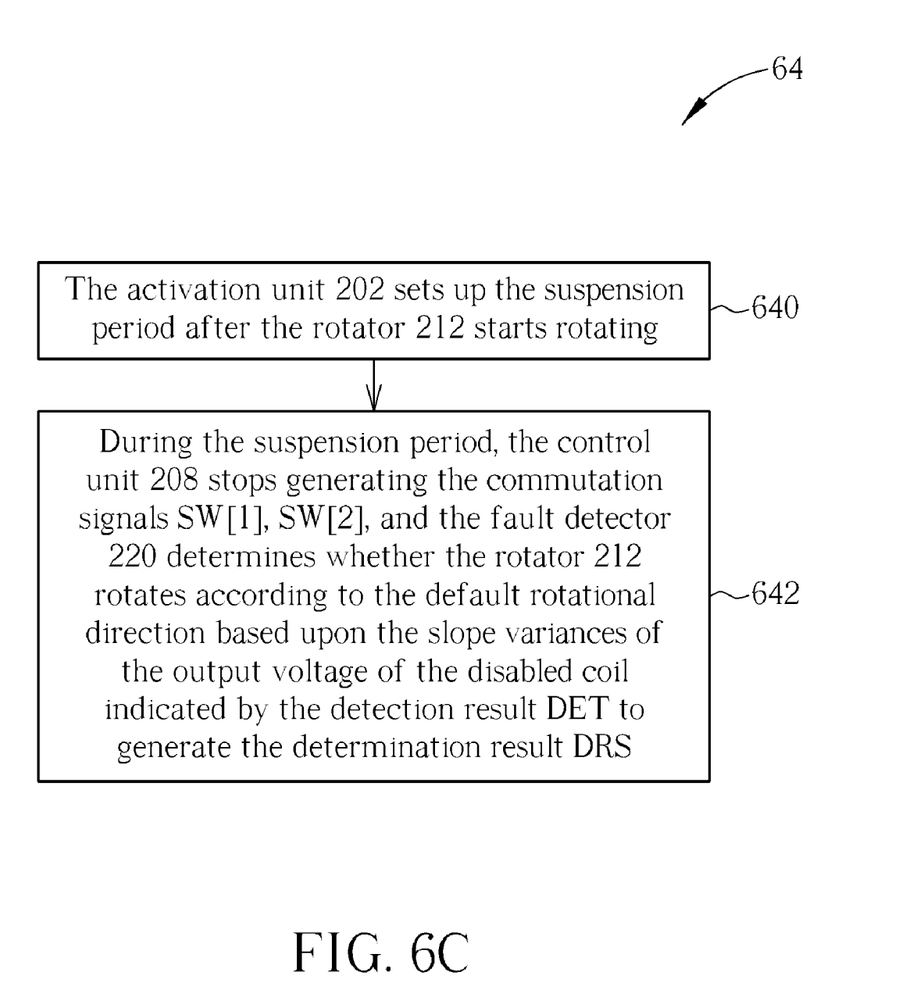
FIG. 6C is a schematic diagram of a fault detection sub-process according to an embodiment of the present invention.

Operations of the driver 230 can be summarized into a process 60, an activation sub-process 62 and a fault detection sub-process 64, as illustrated in FIG. 6A, FIG. 6B and FIG. 6C respectively. The process 60 includes the following steps:

Step 600: Start.

Step 602: Perform the activation sub-process 62 to activate the two-phase brushless motor 200.

Step 604: The detection unit 204 detects the output voltage of the disabled coil of the first coil 214 and the second coil 216 to generate the detection result DET.

Step 606: The comparison unit 206 compares the detection result DET and the reference voltage VREF to determine the commutation time point T_SW between the first coil 214 and the second coil 216.

Step 608: The control unit 608 generates commutation signals SW[1], SW[2] according to the commutation time point T_SW.

Step 610: The driving unit 210 drives the two-phase brushless motor 200 according to the commutation signals SW[1], SW[2].

Step 612: Perform the detection sub-process 64 to generate the determination DRS.

Step 614: Does the determination result DRS indicate that the two-phase brushless motor 200 rotates according to the default rotational direction? If true, proceed to Step 619; else, proceed to Step 616.

Step 616: The control unit 208 stops generating the commutation signals SW[1], SW[2] to stop rotation of the two-phase brushless motor 200.

Step 618: Return to Step 602 after the two-phase brushless motor 200 is completely stopped.

Step 619: Repeat Step 604 to Step 610 to continuously drive the two-phase brushless motor 200.

The activation sub-process 62 includes the following steps:

Step 620: The activation unit 202 generates the activation signal ACT.

Step 622: The control unit 208 generates the temporary commutation signals SW_temp[1], SW_temp[2] according to the activation signal ACT.

Step 624: The driving unit 210 respectively and temporarily enables the first coil 214 and the second coil 216 according to the temporary commutation signals SW_temp[1], SW_temp[2] to generate the electromagnetic response signal.

Step 626: The activation unit 202 determines the starting position of the rotator 212 according to electromagnetic response signal.

Step 628: The control unit 208 generates the activation commutation signal.

Step 630: The driving unit 210 supplies power to the first coil 214 or the second coil 216 according to activation commutation signal.

The fault detection sub-process 64 includes the following steps:

Step 640: The activation unit 202 sets up the suspension period after the rotator 212 starts rotating.

Step 642: During the suspension period, the control unit 208 stops generating the commutation signals SW[1], SW[2], and the fault detector 220 determines whether the rotator 212 rotates according to the default rotational direction based upon the slope variances of the output voltage of the disabled coil indicated by the detection result DET to generate the determination result DRS.

Detailed description of the process 60, the activation sub-process 62 and the fault detection sub-process 64 can be referred in the above, and is not further narrated herein. Certainly, those skilled in the art can make modifications and variations of the processes 60, 62, 64. For example, the process 60 can be modified to periodically perform the fault detection sub-process 64 or directly omit the fault detection sub-process 64.

In the prior art, the two-phase brushless motor system 10 detects the position of the rotator 100 by the Hall sensor 132 to determine the commutation time point between the coils 112, 114. However, with limited sensitivity, the Hall sensor 132 cannot correctly detect the position of the rotator 100 when the magnetic field nearby is insignificant, causing irregularities in the motor system 10. Moreover, installation of the Hall sensor 132 increases volume and cost of the motor system 10, and is particularly disadvantageous when the manufacturer desires to embed the motor system 10 in electronic devices. In comparison, the present invention chooses the output voltage of the disabled coil to be a criterion for determining the position of the rotator 212 by detecting variances of the output voltages VOUT1, VOUT2 of the first coil 214 and the second coil 216 to determine the commutation time point T_SW between the first coil 214 and the second coil 216, so as to replace the Hall sensor 132. Moreover, the present invention provides the activation sub-process 62 and the fault detection sub-process 64 for the driver 230, such that the motor 200 can be correctly activated and rotate according to the default rotational direction.

To sum up, the present invention determines the position of the rotator of the two-phase brushless motor according to the output voltage of the stator coil, and accordingly generates corresponding driving signals to correctly drive the motor.

Those skilled in the art will readily observe that numerous modifications and alterations of the device and method may be made while retaining the teachings of the invention.

What is claimed is:

1. A method for driving a two-phase brushless motor comprising a rotator with permanent magnetism and a stator comprising a first coil and a second coil, the method comprising:
    activating the two-phase brushless motor;
    detecting an output voltage of a disabled coil of the first coil and the second coil to generate a detection result;
    comparing the detection result and a reference voltage to determine a commutation time point between the first coil and the second coil;
    generating a commutation signal according to the commutation time point; and
    driving the two-phase brushless motor according to the commutation signal;
    wherein the step of activating the two-phase brushless motor comprises:
        generating an activation signal;
        generating a temporary commutation signal according to the activation signal;

respectively and temporarily enabling the first coil and the second coil according to the temporary commutation signal to generate an electromagnetic response signal;
determining a starting position of the rotator according to the electromagnetic response signal;
generating an activation commutation signal according to the starting position; and
supplying power to the first coil or the second coil according to the activation commutation signal.

2. The method of claim 1, wherein the step of comparing the detection result and the reference voltage to determine the commutation time point between the first coil and the second coil is assigning a time point at which the detection result is equal to the reference voltage to be the commutation time point.

3. The method of claim 1, wherein a voltage level of the commutation signal is varied at the commutation time point.

4. The method of claim 3, wherein the step of driving the two-phase brushless motor according to the commutation signal is enabling the disabled coil and disabling an active coil of the first coil and the second coil when the voltage level of the commutation signal is varied.

5. The method of claim 1, wherein the electromagnetic response signal is a response voltage potential of the disabled coil of the first coil and the second coil.

6. The method of claim 1, wherein the step of determining the starting position of the rotator according to the electromagnetic response signal is determining the starting position according to a decay period of the electromagnetic response signal.

7. The method of claim 1, wherein the step of generating the activation commutation signal according to the starting position is generating the activation commutation signal, such that the rotator starting to rotate from the starting position rotates according to a default rotational direction of the two-phase brushless motor.

8. The method of claim 1 further comprising:
determining whether the rotator rotates according to a default rotational direction of the two-phase brushless motor according to the detection result to generate a determination result; and
controlling the two-phase brushless motor according to the determination result.

9. The method of claim 8, wherein the step of determining whether the rotator rotates according to the default rotational direction of the two-phase brushless motor according to the detection result to generate the determination result comprises:
setting up a suspension period after the rotator starts rotating; and
stopping generating the commutation signal and determining whether the rotator rotates according to the default rotational direction based on slope variation of the output voltage of the disabled coil indicated by the detection result to generate the determination result during the suspension period.

10. The method of claim 8, wherein the step of controlling the two-phase brushless motor according to the determination result comprises:
stopping generating the commutation signal when the determination result indicates that the rotator does not rotate according to the default rotational direction of the two-phase brushless motor to stop rotation of the two-phase brushless motor; and restarting the rotation of the two-phase brushless motor after the two-phase brushless motor is completely stopped.

11. A driver for driving a two-phase brushless motor comprising a rotator with permanent magnetism and a stator comprising a first coil and a second coil, the driver comprising:
an activation unit, coupled to the two-phase brushless motor, for activating the two-phase brushless motor and generating an activation signal to activate the two-phase brushless motor;
a detection unit, coupled to the two-phase brushless motor, for detecting an output voltage of a disabled coil of the first coil and the second coil to generate a detection result;
a comparison unit, coupled to the detection unit, for comparing the detection result and a reference voltage to determine a commutation time point between the first coil and the second coil;
a control unit, coupled to the comparison unit, for generating a commutation signal according to the commutation time point and generating a temporary commutation signal according to the activation signal; and
a driving unit, coupled to the control unit, for driving the two-phase brushless motor according to the commutation signal.

12. The driver of claim 11, wherein the comparison unit assigns a time point at which the detection result is equal to the reference voltage to be the commutation time point.

13. The driver of claim 11, wherein the control unit varies a voltage level of the commutation signal at the commutation time point.

14. The driver of claim 13, wherein the driving unit enables the disabled coil and disables an active coil of the first coil and the second coil when the voltage level of the commutation signal is varied.

15. The driver of claim 11, wherein the driving unit is further utilized for respectively and temporarily enabling the first coil and the second coil according to the temporary commutation signal to generate an electromagnetic response signal.

16. The driver of claim 15, wherein the electromagnetic response signal is a response voltage potential of the disabled coil of the first coil and the second coil.

17. The driver of claim 15, wherein the activation unit is further utilized for determining a starting position of the rotator according to the electromagnetic response signal.

18. The driver of claim 17, wherein the activation unit determines the starting position according to a decay period of the electromagnetic response signal.

19. The driver of claim 17, wherein the control unit is further utilized for generating an activation commutation signal according to the starting position.

20. The driver of claim 19, wherein the control unit generates the activation commutation signal, such that the rotator starting to rotate from the starting position rotates according to a default rotational direction of the two-phase brushless motor.

21. The driver of claim 19, wherein the driving unit is further utilized for supplying power to the first coil or the second coil according to the activation commutation signal.

22. The driver of claim 11, further comprising a fault detector, coupled to the detection unit, the comparison unit, the control unit and the activation unit, for determining whether the rotator rotates according to a default rotational direction of the two-phase brushless motor based on the detection result to generate a determination result, and controlling the two-phase brushless motor according to the determination result.

23. The driver of claim 22, wherein the activation unit is further utilized for setting up a suspension period after the rotator starts rotating.

24. The driver of claim 23, wherein the control unit stops generating the commutation signal during the suspension period and determines whether the rotator rotates according to the default rotational direction based on slope variation of the output voltage of the disabled coil indicated by the detection result to generate the determination result.

25. The driver of claim 22, wherein the control unit stops generating the commutation signal when the determination result indicates that the rotator does not rotate according to the default rotational direction of the two-phase brushless motor to stop rotation of the two-phase brushless motor.

26. The driver of claim 25, wherein the activation unit restarts the rotation of the two-phase brushless motor after the two-phase brushless motor is completely stopped.

* * * * *